United States Patent [19]

Wainwright

[11] Patent Number: 5,322,746
[45] Date of Patent: Jun. 21, 1994

[54] ELECTRODE COMPOSITION AND DESIGN FOR HIGH ENERGY DENSITY CELLS

[75] Inventor: David Wainwright, Vancouver, Canada

[73] Assignee: Her Majesty the Queen in Right of the Province of British Columbia as represented by the Minister of Finance & Corporate Relations, Bancouver

[21] Appl. No.: 956,643

[22] Filed: Oct. 2, 1992

[51] Int. Cl.$^5$ ............................................. H01M 4/58
[52] U.S. Cl. ...................................... 429/60; 429/191; 429/192; 429/193; 429/204; 429/218; 429/221; 429/224; 429/233; 429/245
[58] Field of Search ......................... 429/60, 191–193, 429/204, 218, 220–221, 224, 233, 245

[56] References Cited

U.S. PATENT DOCUMENTS

| | | | |
|---|---|---|---|
| 3,174,878 | 12/1958 | Peters | 429/60 |
| 3,174,879 | 3/1965 | Stanimirovitch | 429/60 |
| 4,622,277 | 11/1986 | Bedder et al. | 429/94 |
| 4,925,752 | 3/1990 | Fauteux et al. | 429/191 |

OTHER PUBLICATIONS

Levy, S. C. and Crafts, C. C., The Electrochemical Society Fall Meeting Extended Abstract No. 14, Oct. 11–16, 1981, Denver, Colo.

Primary Examiner—Prince Willis, Jr.
Assistant Examiner—M. Nuzzolillo
Attorney, Agent, or Firm—Isaac A. Angres; Charles C. Liang

[57] ABSTRACT

Nonaqueous electrolyte rechargeable cells may contain an excess of negative electrode material to improve the rechargeability. This excess of negative electrode material can form brittle alloys with noncorrosive current collector metals in positive electrodes at low cell voltages. The invention discloses that an excess of current collector material in the positive electrode directly opposite to the negative electrode improves the safety characteristics of the rechargeable cells during overdischarge and multiple voltage reversal abuses.

10 Claims, 4 Drawing Sheets

ELECTRODE COMPOSITION AND DESIGN FOR HIGH ENERGY DENSITY CELLS

BACKGROUND OF THE INVENTION

This invention relates to high energy density electrochemical cells. More specifically, this invention pertains to high energy density rechargeable cells having a novel composition and structural design for the positive electrode to enhance the performance and safety characteristics of the cell during overdischarge and voltage reversal abuses.

In response to an increasing demand for sophistication and miniaturization in energy conversion and storage devices by users in electronics, electro-medical and other industries, many high energy density primary and secondary cells have been developed in recent years. Among these are the ambient temperature nonaqueous electrolyte cells using alkali metals such as lithium or alkaline earth metals such as calcium as anode active materials and insertion compounds such as manganese oxides or soluble oxidizing agents such as sulfur dioxide as cathode active materials. The high energy density permits the miniaturization of the cells without sacrificing performance. On the other hand, cells with high energy densities are susceptible to damage under certain abusive conditions, especially when they are capable of delivering high currents. One such abuse occurs in a multi-cell battery where a cell is overdischarged and driven into voltage reversal by other cells in the circuit. The cause for such an occurrence is that in practice it is difficult to manufacture cells with identical capacities and identical internal impedances. Therefore, it is possible that one cell will exhaust its capacity before the remaining cells in the battery during discharge. Under this condition, the cell with nearly exhausted capacity can be driven to voltage reversal by the remaining cells in the battery. Various electrochemical reactions occur during voltage reversal. In the event that these electrochemical reactions are not controlled, excessive local heating, or more severely, run-away heating will occur leading to cell bulging, venting or rupturing.

Attempts have been made by those who practice in the art to enhance the abuse resistance of high energy density nonaqueous primary cells having an alkali or alkaline earth metal anode. A design feature is taught in U.S. Pat. No. 4,622,277 to prevent cells with the spirally wound cell structure from bulging or venting during voltage reversal abuse. The design feature comprises a first segment of exposed inert metal connected to the cathode and a dendrite target of a second segment of exposed inert metal connected to the anode. The two segments of exposed metal are oriented to face each other but are held in physical isolation by the separator interposed between them. During voltage reversal dendrites grow from the first segment of inert metal to the dendrite target thereby forming a least resistance path between the two electrodes for the current to pass through without generating excessive heat. As a result, the cell is safer and more abuse resistant. It should be noted that U.S. Pat. No. 4,622,277 relates to cells containing "inert" metal cathode current collectors (e.g. aluminum). Inasmuch as lithium can form alloys with aluminum at room temperature, aluminum may not qualify as an inert metal in a cell containing a lithium metal or lithium alloy anode, depending upon the relative capacity of the electrodes. It is true that a lithium cell with an anode coulombic capacity not more than the cathode capacity (a balanced or anode limited cell design) has insufficient lithium to alloy with aluminum hardware at cathode potential. Accordingly, aluminum can be regarded as "inert". On the other hand, aluminum may not be "inert" in a lithium cell containing an excess of negative electrode material, i.e. the coulombic capacity of the negative electrode exceeds that of the positive electrode. Indeed, this is the case in high energy density lithium rechargeable cells which are generally designed to contain an excess of negative electrode material to improve the rechargeability.

In high energy density nonaqueous electrolyte cells the cathode materials are strong oxidizing agents. Therefore, the cathode current collectors must be corrosion resistant and compatible both physically and chemically with the cathode and electrolyte. Corrosion resistant metals such as aluminum, titanium, tantalum and niobium are suitable positive electrode current collector materials. Aluminum is the preferred material due to its low cost and compatibility with a variety of cathodes and electrolytes. Although these metals are corrosion resistant and compatible with respect to the cathode and electrolyte materials, some of them often form alloys or intermetallic compounds with alkali or alkaline earth metals. For example, alloys or intermetallic compounds such as AlLi, $Al_3Mg_2$, $Al_2Ca$ and $Al_5Ba_4$ have been reported in the literature and phases diagrams of the Al-Li, Al-Ba, Al-Ca, Al-Mg binary systems can be found in "Moffatt, W.G., *The Handbook of Binary Phase Diagrams,* 1984 Revision, Genium Publishing Corp, Schenectady, N.Y.". In the event that a cell, wherein the anode capacity is higher than the cathode capacity, is subjected to an overdischarge abuse, the excess of anode material will reach the cathode through the electrolyte to form alloys or intermetallic compounds with the accessible current collector material at the stage of cathode exhaustion. These alloys or intermetallic compounds tend to be grainy and brittle, thus their formation may lead to the destruction of the physical integrity of the current collector.

This problem is severe in the case of a secondary or rechargeable cell wherein the current collector of the positive electrode is likely to be attacked by the negative electrode material repeatedly during multiple discharge/charge cycles and multiple voltage reversals. This may lead to the loss of electrical continuity of the positive electrode, formation of dendritic bridges at unpredictable sites and other unpredictable and unsafe situations.

The possibility of alloy formation between Al (cathode current collector material) and Li in primary Li/$SO_2$ cells has been postulated (see Levy, S. C. and Crafts, C. C., The Electrochemical Society Fall Meeting Extended Abstract No. 14, Oct. 11-16, 1981, Denver, Colo.) to explain the shock sensitivity of some Li/$SO_2$ cells after discharge. One of the design changes suggested by Levy and Crafts to alleviate the shock sensitivity of Li/$SO_2$ cells was to increase the length of the cathode current collector.

It is important to note, however, that in the high energy density rechargeable cell of this invention, an increase in the length of Al current collector in a rectangular positive electrode beyond the positive electrode material coverage would not improve the safety characteristics during overdischarge and voltage reversal abuses. In other words, the added current collector material which is not physically in direct opposition to the active negative electrode (i.e. not locally available) cannot act as a source for the collector material contributing to the enhancement of current collector integrity during abuse. In the event that the geometric area of the negative electrode is large enough to be directly opposite to not only the positive electrode but also a portion of the bare current collector, the bare and uncovered (by positive electrode material) current collector tends to be preferentially "attacked" by the negative electrode to form alloys or intermetallic compounds during deep discharge cycles, especially at the interface line where the positive electrode material coverage ends and bare collector surface begins. Thus, the loss of electrical continuity may occur in the positive electrode even earlier than in an electrode with no extra length of current collector.

SUMMARY OF THE INVENTION

The object of this invention is to provide a high energy density rechargeable cell having enhanced safety characteristics during overdischarge and voltage reversal abuses.

A further object of this invention is to provide an electrode composition and structure and a cell design to maintain the electrical continuity of the positive electrode and to prevent unsafe occurrences during multiple overdischarges and voltage reversals of the high energy density rechargeable cell.

The positive electrode of this invention comprises a positive electrode material adhered to a current collector made of Al, or an alloy containing Al. The total amount of Al in the current collector material must exceed the total excess of negative electrode which is available for the formation of brittle alloys or intermetallic compounds under overdischarge conditions. Moreover, the amount of Al per unit area located in direct opposition to the negative electrode must exceed the excess of negative electrode material locally available for alloy formation. Thus, the excess amount of current collector material can maintain the physical and electrical integrity of the positive electrode, notwithstanding the formation of brittle alloys or intermetallic compounds during overdischarge abuses.

DESCRIPTION OF THE PREFERRED EMBODIMENTS

Figure 1:
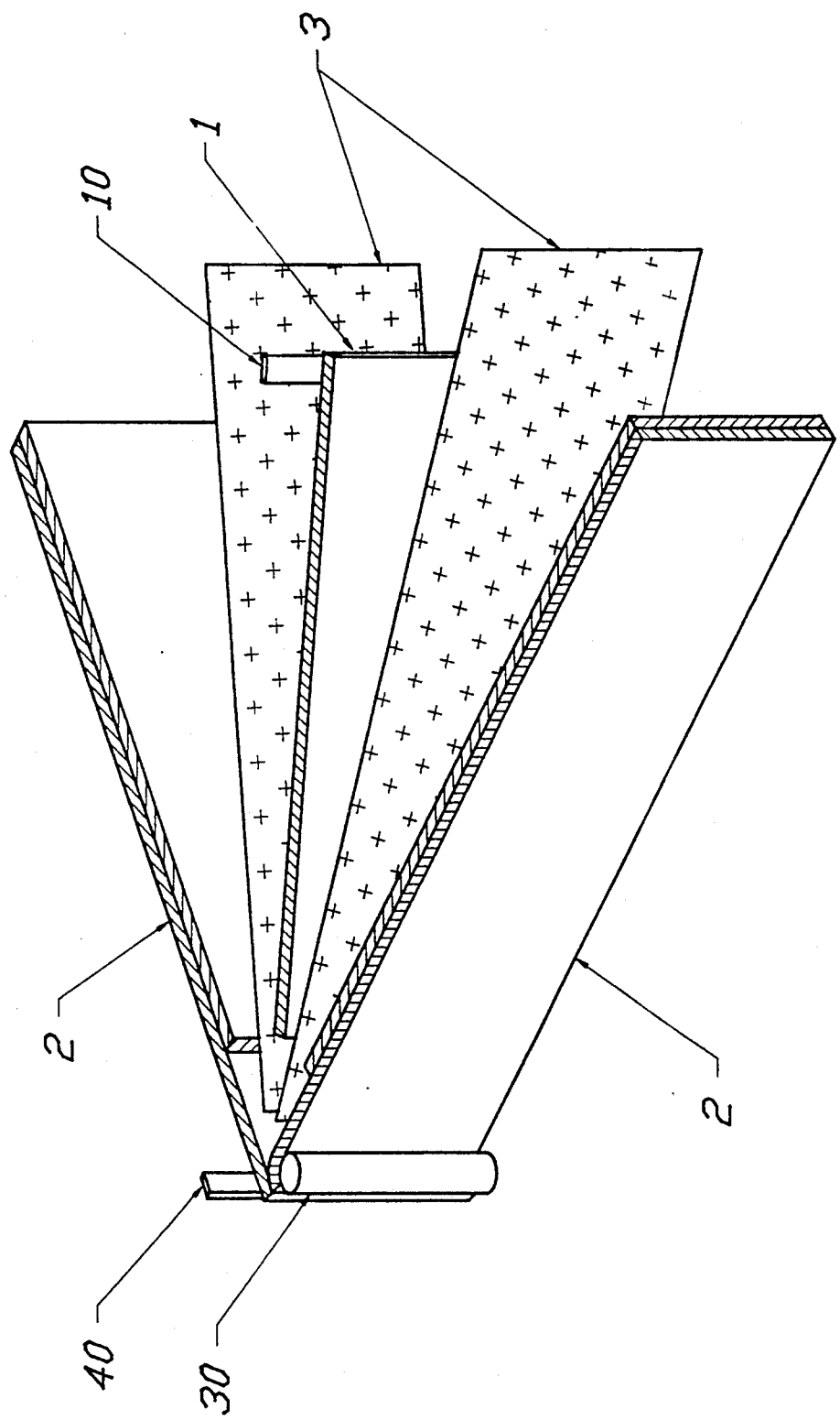
FIG. 1 is an expanded isometric view of the internal components of the rechargeable cell having a positive electrode and cell structure in accordance with this invention.

The present invention is particularly directed to a rechargeable electrochemical cell having a nonaqueous electrolyte, a negative electrode containing negative electrode active species selected from the group consisting of alkali and alkaline earth metals, and a positive electrode comprising a positive electrode material adhered to a current collector of a noncorrosive metal selected from the group consisting of aluminum and alloys of aluminum; wherein (a) the coulombic capacity of the negative electrode exceeds that of the positive electrode;

(b) said negative electrode and positive electrode are directly opposite to each other; and the geographic area of said negative electrode is not greater than that of said positive electrode;

(c) the amount of Al in the positive electrode current collector directly opposite to the negative electrode is at least 10% more than the amount of Al necessary to form, with the excess of the negative electrode active species in the negative electrode, an alloy or intermetallic compound having a minimum aluminum mole fraction of 0.5, thereby maintaining the electrical and mechanical integrity of the positive electrode and its current collector under overdischarge and multiple voltage reversal abuses.

In the rechargeable electrochemical cell according to the present invention the negative electrode active species in the negative electrode is lithium, which is contained in a material selected from the group consisting of metallic lithium, alloys containing lithium, insertion compounds containing lithium and carbon matrices containing lithium.

The positive electrode material for the rechargeable electrochemical cell according to the invention is selected from the group consisting of iron sulfides, copper sulfides, copper chloride, vanadium oxides, amorphous vanadium pentoxide and phosphorus pentoxide, titanium disulfide, molybdenum sulfides, manganese oxides, niobium triselenide, lithium titanium disulfide, lithium molybdenum disulfide, lithium iron sulfide, lithium copper sulfide, lithium manganese dioxide, lithium nickel oxide, lithium cobalt oxide, lithium cobaltnickel oxide and mixtures thereof.

In one embodiment of the invention the nonaqueous electrolyte is a solution containing sulfur dioxide, and the positive electrode material comprises a carbon powder compressingly adhered to the aluminum current collector.

In an alternate embodiment, a cell according to the invention contains as the nonaqueous electrolyte a solution containing an oxyhalide, and the positive electrode material comprises a carbon powder compressingly adhered to the aluminum current collector.

The rechargeable electrochemical cell according to the present invention may also contain as the nonaqueous electrolyte a solution of at least one appropriate salt in at least one aprotic solvent.

In a further embodiment, the nonaqueous electrolyte is a solid electrolyte, such as a solid ionic compound. Typical examples of solid ionic compounds include lithium ion conductors and solid polymer electrolytes.

In a preferred embodiment, an Al foil is used as the current collector for the positive electrode in a nonaqueous electrolyte rechargeable cell having lithium metal as the active negative electrode and solid insertion compounds such as lithiated or lithium cobalt oxide, nickel oxide, cobaltnickel oxide, manganese oxide, titanium disulfide and molybdenum disulfide ($Li_xCoO_2$, $Li_xNiO_2$, $Li_xCo_{1-y}Ni_yO_2$, $Li_xMnO_2$, $Li_xTiS_2$, and $Li_xMoS_2$ respectively [where $0<y<1$; $0<x<1$]) as the active positive electrode materials. Other solids such as iron sulfides, copper sulfides, copper chloride, vanadium oxides, amorphous vanadium pentoxide and phosphorus pentoxide, titanium disulfide, molybdenum sulfides, manganese oxides, niobium triselenides, lithium copper sulfide, lithium iron sulfides and a mixture of these solids including aforementioned solid insertion compounds are also suitable positive electrode materials. In this embodiment, the coulombic capacity of the negative electrode is more than twice that of the positive electrode in order to achieve a useful cycle life. In an overdischarge situation, the excess of Li continues to reach the positive electrode through the electrolyte. Since no positive electrode material is available for electrochemical reactions at the stage of overdischarge, the arriving Li is forced to react with the available Al in the current collector forming an alloy or intermetallic compound. The embrittlement of the Al current collector by the formation of the alloy or intermetallic compound AlLi is detrimental to the mechanical and electrical integrity of the positive electrode current collector if the amount of Al available therein is less than the excess of Li. Therefore, the current collector of the positive electrode must be in such a thickness that a sufficient amount of Al per unit area located in direct opposition to the Li negative electrode is available to maintain the integrity in addition to the formation of AlLi during repeated overdischarge and voltage reversal abuses.

Figure 2:
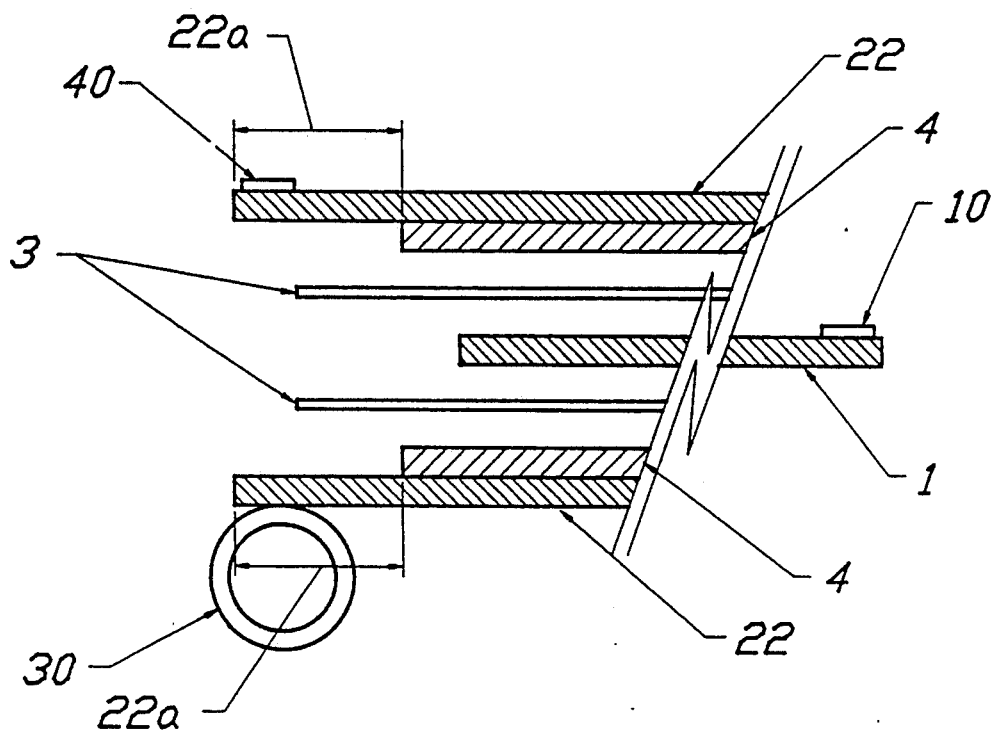
FIG. 2 is an expanded top view of the internal components of the rechargeable cell in accordance with this invention as shown by FIG. 1.

FIG. 1 shows an expanded isometric view of an electrode and separator assembly or internal components of a rechargeable cell in accordance with this invention. This embodiment incorporates a center Li negative electrode 1 with a Ni tab negative electrode terminal connector 10, a dual positive electrode 2, connected at an Al positive electrode terminal connector, positioned at either side and in direct opposition to the center Li negative electrode 1. Said positive electrode terminal connector comprises an Al tubing part 30, and an Al tab part 40. The electrodes are separated by two sheets of microporous polyolefin separators 3. FIG. 2 shows an expanded top view of the assembly described in FIG. 1. The positive electrode 2 comprises a lithiated $MnO_2$ positive electrode material 4 adhered to an Al foil current collector 22 of such a foil thickness that the amount of Al in the current collector is more than that which is necessary to form the intermetallic compound AlLi with the excess of Li present in the negative electrode 1. Moreover, the efficacy of this invention depends on the presence of an excess amount of Al locally with respect to the position of negative electrode 1. In other words, the excess amount of Al must be present locally at the section of positive electrode which is covered with the electrode material 4 and located in direct opposition to the Li electrode 1. The presence of Al in other areas, e.g. the section of current collector 22a which is not covered by electrode material and positive electrode terminal connector tubing 30 and tab 40, is ineffective as a source of Al to maintain the current collector integrity during voltage reversal under practical discharge rates. Therefore, increasing the length of Al current collector or increasing the size of positive electrode terminal connector or other similar measures will not ensure the electrical and mechanical integrity of the positive electrode during overdischarge and voltage reversal abuses.

Figure 3:
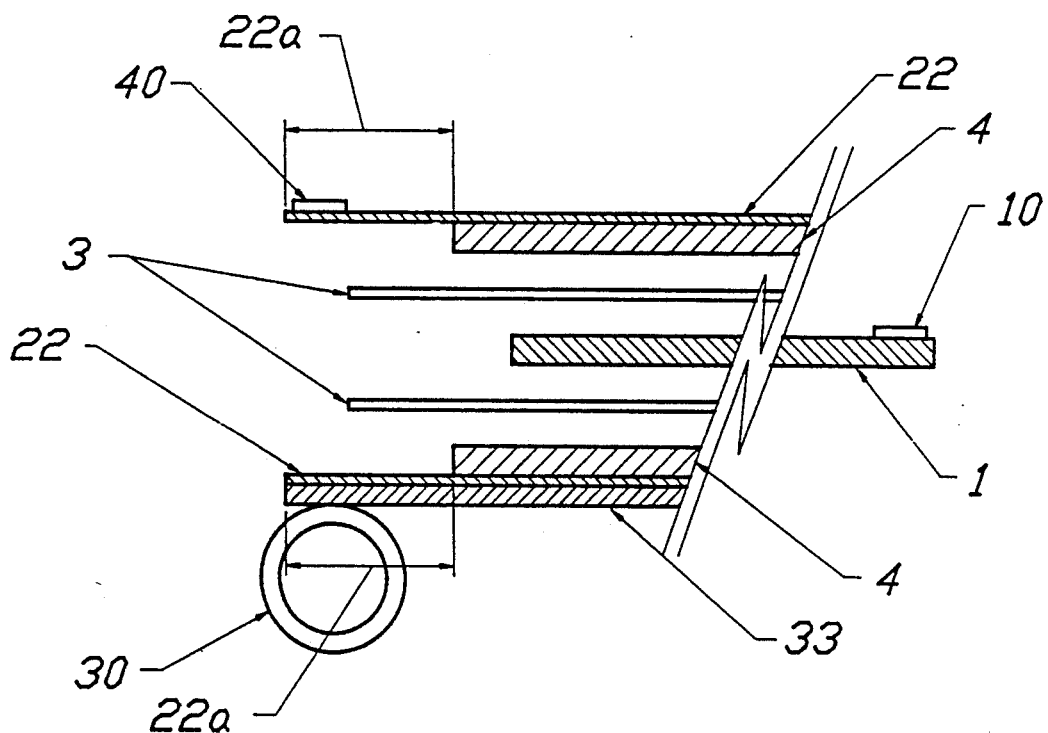
FIG. 3 is an expanded top view of the internal components of a rechargeable cell having an alternate positive electrode structure in accordance with this invention.

FIG. 3 shows an expanded top view of the internal components of a rechargeable cell having an alternate design structure for the positive electrode in accordance with this invention. Similar to the structure shown by FIG. 2, this embodiment also incorporates a central Li negative electrode 1 with a Ni tab negative electrode termination 10, a dual positive electrode 2, connected at an Al positive electrode terminal connector, positioned at either side and in direct opposition to the center Li negative electrode 1. Said positive electrode terminal connector comprises an Al tubing part 30, and an Al tab part 40. The electrodes are isolated by two sheets of microporous polyolefin separators 3. However, to the positive electrode current collector an extra Al foil 33 is attached in order to effectively increase the total thickness of the current collector. Thus, a sufficient amount of Al is present to maintain the physical and electrical integrity of the current collector and positive electrode during overdischarge and voltage reversal abuses.

The effect of the positive electrode composition and structural design of this invention on the improvement of electrode integrity and cell safety during overdischarge and voltage reversal abuses will be shown in detail hereinafter using the following Examples. In these Examples, only cells having solid active positive electrode materials, metallic negative electrodes and solution electrolytes are tested. Nevertheless, the present invention is also applicable to cells containing soluble cathode materials such as sulfur dioxide and oxyhalides in electrolytes with current collecting positive electrodes comprising a carbon powder compressingly adhered to an Al foil or grid. In addition to pure metals, the present invention also deals with active negative electrode materials being contained in alloys or insertion compounds. Moreover, the term "nonaqueous electrolyte" in the present application has a broad meaning. It refers not only to a solution electrolyte containing at least one appropriate salt in at least one aprotic solvent but also a solid electrolyte containing one or more solid ionic compounds including compounds which are lithium ion conductors. In addition, solid polymer electrolytes are also included in the category of nonaqueous electrolytes. Accordingly, it is understood that such Examples are for illustrative purposes d the details contained therein should not be construed as limitations on the present invention.

(A) Abuse Tests Using Laboratory Test Cells

Example 1

A laboratory test cell was constructed using a Li foil anode, a nonaqueous electrolyte of 1M $LiAsF_6$ in a mixture of propylene carbonate and ethylene carbonate (in a 1 to 1 volume ratio), and an Al foil cathode. The Li foil was cut into a 12.7 mm square with a thickness of 0.127 mm. The Al foil was cut into a similar size square, but was only 0.050 mm in thickness. The electrodes were separated by a 50 μm thick microporous polypropylene separator (Celgard 2502) and an excess of electrolyte was used.

The above described anode/separator/cathode sandwich assembly and electrolyte were crimp sealed in a laboratory cell case similar to the commercial 2320 coin size cell case. A mechanical pressure of approximately 5.6 kg/cm$^2$ (80 psi) was applied to the sandwich assembly using an internal Belleville type spring and a 0.3 mm thick pressure plate.

The cell was shorted externally for approximately 100 hours. Afterwards, it was disassembled and the internal components were examined. The alloyed Al foil had become grey throughout and fragmented. The fragments were very brittle and fragile and could not be lifted from the cell case without being further damaged.

The mole ratio of Li to Al in this cell was approximately 1.9. This demonstrated that no Al was left in the cathode to maintain its integrity under these conditions.

Example 2

A laboratory test cell similar to that of Example 1 was constructed except that the Li anode was 0.050 mm thick.

Again the cell was shorted externally for approximately 100 hours. On disassembly, it was noted that the alloyed Al appears to be grey throughout and brittle. It could not be bent without cracking. However, the piece was intact on disassembly. It could be picked up and poked lightly with tweezers without further damage.

The mole ratio of Li to Al in this cell was approximately 0.8. This demonstrates that enough Al was left in the cathode to maintain its mechanical integrity under these conditions.

(B) ABUSE TESTS USING AA SIZE TEST CELLS

In the following Examples (3 to 5), AA size test cells were constructed and subjected to an abuse test consisting of repeated charge and discharge cycles. These test cells all contained Li metal foil negative electrode of varying thickness and an electrolyte similar to that used in Example 1. The positive electrode was fabricated by coating 18 μm thick Al foil with a mixture containing a lithium manganese oxide powder, a conductive diluent, and a binder. The coating was applied on one side and was approximately 21 mg/cm$^2$ by weight. Both negative and positive electrodes were 4.2 cm wide.

As shown in FIG. 1, the internal assembly of the AA size test cell incorporates a center Li negative electrode 1 with a Ni tab negative electrode terminal connector 10, a dual positive electrode 2, connected at an Al positive electrode terminal connector positioned at either side and in direct opposition to the central Li negative electrode 1. Said positive electrode terminal connector comprises an Al tubing part 30, and an Al tab part 40. The electrodes are separated by two sheets of 4.6 cm wide microporous polyolefin separators 3. The geometric surface area of the electrodes was about 200 cm$^2$.

Figure 5:
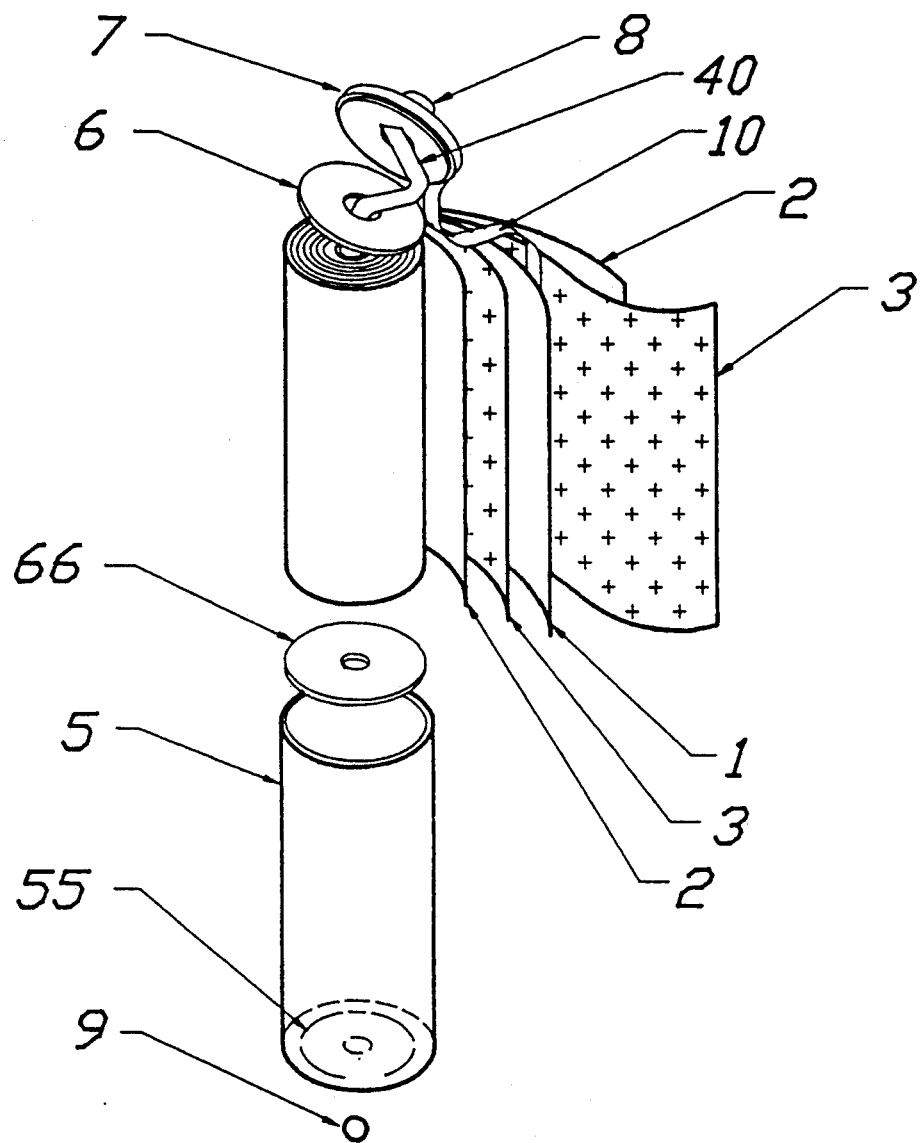
FIG. 5 is an exploded view of a rechargeable cell in accordance with this invention having a jelly roll structure comprising the internal components of the cell.

A jelly roll winding was constructed using the assembly as shown in FIG. 1. The Al tubing part 30 shown in FIG. 1 served as a mandrel for the winding process. FIG. 5 is an exploded view of the AA cell including the jelly roll structure and external hardware. The jelly roll is shown in a AA size Ni plated cold rolled steel can 5 with a safety pressure vent 55 at the bottom of the cell can. The jelly roll is shown to be partially unwound to show that the electrode assembly comprises a central Li negative and two positive electrodes 2 on either side of the Li electrode 1. The electrodes are separated by microporous polyolefin separators 3. The cell is sealed using a cap 7 with a rivet seal type feedthrough 8. A top insulating disk 6 and a bottom insulating disk 66 are used to prevent internal short circuit. Terminal connectors 10 and 40 are welded to the cap 7 and feedthrough 8 respectively. Thus, the feedthrough 8 and the cap 7 (welded to the cell can 5) are respectively the positive and negative terminals of the cell. A small hole located at the bottom of the cell can is provided for electrolyte filling. A small ball 9 is welded to the hole to close the cell.

The test cells underwent an abuse test consisting of multiple fixed capacity cycles at 21° C. Starting on discharge, from an as assembled and fully charged condition, ±900 mAh were forced through the cell at a 600 mA discharge and a 60 mA charge rate. The fixed capacity of 900 mAh exceeded the nominal positive electrode capacity of 700 mAh for these cells. However, the capacity of the negative electrode was at least 2 Ah in these cells. Thus, this amount of charge did not exceed the nominal negative electrode capacity.

During abuse tests of this type, the nominal capacity of the positive electrode would be exhausted on the first discharge. After this, other reactions would occur including alloying of the Al current collector with Li. This alloying is reversible to some extent. However, after repeated cycles, the cell impedance would increase. One reason for this is the degradation of the Al current collector. Voltage excursions above the nominal 3.5 V on charge and below zero volts (i.e. voltage reversal) on discharge would eventually occur. Brief voltage spikes to the compliance of the test equipment might be noted (a minimum of −10 V) during reversal. These spikes indicate a transient internal open circuit condition. These test cells are equipped with safety pressure vents. Upon reaching an internal pressure of about 50 kg/cm$^2$ (700 psi), the safety vent would be activated (open) and cell venting would occur.

Example 3

Figure 4:
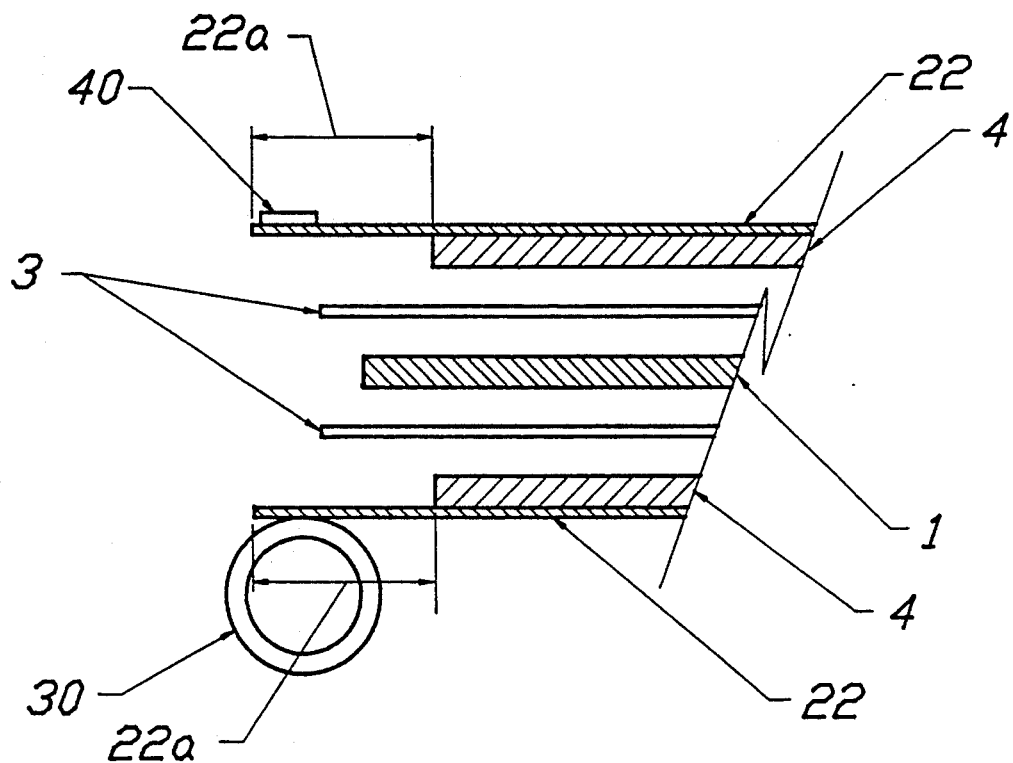
FIG. 4 is an expanded top view of the internal components in an electrochemical cell in accordance to prior art.

A "AA" size test cell was constructed as described above. FIG. 4 shows an expanded top view of the internal assembly of this cell. Two positive electrodes 2 are connected at a positive terminal connector consisting of a tubing part 30 (mandrel) and a tab part 40. Said positive electrode 2 comprises a positive electrode material 4 adhered to an 18 μm thick Al foil current collector 22 in such a manner that a substantial portion of the current collector 22a is not covered by the positive electrode material. A 100 μm thick Li negative electrode 1 is positioned between the two positive electrodes 2 and physically isolated by two pieces of microporous polyolefin separators 3. The jelly roll winding of the test cell was initiated such that a portion of the Li electrode was directly opposite to the area 22a of the current collector which was not covered by the positive electrode material.

The abuse test described above was performed. The cell began undergoing complete reversal after six discharge/charge cycles. After eighteen cycles (or approximately a total of 180 hours in reversal), the cell was disassembled. The Al at the bare current collector area at the winding initiation (area 22a in FIG. 4) had become powder like and brittle. Upon removing the separator from the positive electrode surface, there was clearly no significant mechanical connection between the Al mandrel (tubing part 30 in FIG. 4) and the collectors in the winding.

The Li to Al ratio in this area was approximately 2.2. This Example demonstrates that a problem exists with respect to collector integrity during overdischarge and voltage reversal abuses when the local Li to Al ratio is more than 1 thus allowing the formation of the alloy or intermetallic compound AlLi. wherein the mole ratio between Al and Li is 1 and the mole fraction of Al is 0.5.

Example 4

A series of AA size test cells were constructed using 127 μm thick Li foil negative electrodes. The internal component windings were configured such that Li electrodes were directly opposite to the areas of positive electrodes covered with electrode material. The relative positions of the positive and negative electrodes are shown in FIG. 2. It should be noted that 18 μm thick Al foil was used as the current collector for the positive electrodes. Accordingly, after subtracting the amount of Li that can react with or be contained in the active positive electrode material, the local Li/Al mole ratio still far exceeds 1 which is the mole ratio in the alloy or intermetallic compound AlLi.

Four of such test cells were subjected to the abuse test as described above. Typically, these cells exhibited erratic voltages in cycles following the onset of voltage reversal. Voltage spikes were common and the voltage profile of a cycle never stabilized. Two cells in this group vented with fire after several discharge/charge cycles following voltage reversal. The discharge/charge cycle tests were terminated on the other two cells to avoid venting so that the physical conditions of the internal components could be examined. Upon disassembly, it was noted that the Al foil was severely pitted and brittle. Neither the electrical nor the mechanical integrity of the positive electrode was well maintained due to the lack of a sufficient amount of Al in the current collector. The local Li to Al mole ratio was approximately 1.8.

Example 5

Another series of AA size test cells were constructed using 127 μm thick Li foil negative electrodes. The internal component windings were configured such that Li electrodes were directly opposite to the areas of positive electrodes covered with electrode material. In order to increase the effective thickness and the amount of Al in the Al current collector, an extra Al foil of 50 μm thickness 33 was attached between the two uncovered sides of the positive current collector as shown in FIG. 3. This additional foil was welded in between the positive electrode terminal connector tubing part 30 and the tab part 40 along with the regular cathode foils 22. Thus, after subtracting the amount of Li that can react with or be contained in the active positive electrode material, the local Li/Al mole ratio is about 0.8 which is less than that in the alloy AlLi. The additional Al should prevent discontinuity in the positive electrodes under abuses described in Example 4.

Three of such test cells were subjected to the abuse test as described above. In contrast to the behavior of the cells in Example 4, these cells exhibited occasional voltage spikes and an unstable voltage profile from cycle to cycle only on the first few cycles after reversal. After the initial few cycles, the voltage profile stabilized and was similar from cycle to cycle in all cases. Also in all cases, the voltage across the cell following stabilization was less than 2 V on either charge or discharge and no cell venting occurred during the 10 to 16 repeated cycles following voltage reversal. After termination of the cycle tests, all three cells were disassembled to examine the conditions of the positive electrode. Although the initial 18 μm thick Al foil under the active cathode was pitted and brittle, the extra Al foil remained ductile and without pits in all three cells.

These results demonstrate that an electrode design which does not provide enough local Al beyond the formation of AlLi with the excess of Li leads to a loss of integrity of the current collector resulting in unsafe behavior of the rechargeable cell during multiple voltage reversal abuses. Conversely, an electrode design which does provide enough local Al beyond the AlLi stage, substantially enhances safety characteristics.

What is claimed is:

1. A rechargeable electrochemical cell having a nonaqueous electrolyte, a negative electrode containing negative electrode active species selected from the group consisting of alkali and alkaline earth metals, and a positive electrode comprising a positive electrode material adhered to a current collector of a noncorrosive metal selected from the group consisting of aluminum and alloys of aluminum; wherein
   (a) the coulombic capacity of the negative electrode exceeds that of the positive electrode;
   (b) said negative electrode and positive electrode are directly opposite to each other; and the geographic area of said negative electrode is not greater than that of said positive electrode;
   (c) the amount of Al in the positive electrode current collector directly opposite to the negative electrode is at least 10% more than the amount of Al necessary to form, with the excess of the negative electrode active species in the negative electrode, an alloy or intermetallic compound having a minimum aluminum mole fraction of 0.5, thereby maintaining the electrical and mechanical integrity of the positive electrode and its current collector under overdischarge and multiple voltage reversal abuses.

2. The rechargeable electrochemical cell according to claim 1, wherein the negative electrode active species in the negative electrode is lithium, which is contained in a material selected from the group consisting of metallic lithium, alloys containing lithium, insertion compounds containing lithium and carbon matrices containing lithium.

3. The rechargeable electrochemical cell according to claim 1, wherein the positive electrode material is selected from the group consisting of iron sulfides, copper sulfides, copper chloride, vanadium oxides, amorphous vanadium pentoxide and phosphorus pentoxide, titanium disulfide, molybdenum sulfides, manganese oxides, niobium triselenide, lithium titanium disulfide, lithium molybdenum disulfide, lithium iron sulfide, lithium copper sulfide, lithium manganese dioxide, lithium nickel oxide, lithium cobalt oxide, lithium cobalt-nickel oxide and mixtures thereof.

4. The rechargeable electrochemical cell according to claim 1, wherein the nonaqueous electrolyte is a solution containing sulfur dioxide, and the positive electrode material comprises a carbon powder compressingly adhered to the aluminum current collector.

5. The rechargeable electrochemical cell according to claim 1, wherein the nonaqueous electrolyte is a solution containing an oxyhalide, and the positive electrode material comprises a carbon powder compressingly adhered to the aluminum current collector.

6. The rechargeable electrochemical cell according to claim 1, wherein the nonaqueous electrolyte is a solution of at least one appropriate salt in at least one aprotic solvent.

7. The rechargeable electrochemical cell according to claim 1, wherein the nonaqueous electrolyte is a solid electrolyte.

8. The rechargeable electrochemical cell according to claim 7, wherein the solid electrolyte contains a solid ionic compound.

9. The rechargeable electrochemical cell according to claim 8, wherein the solid ionic compound is a lithium ion conductor.

10. The rechargeable electrochemical cell according to claim 7, wherein the solid electrolyte is a solid polymer electrolyte.

* * * * *